US009363107B2

(12) United States Patent
Pasternak

(10) Patent No.: US 9,363,107 B2
(45) Date of Patent: Jun. 7, 2016

(54) ACCESSING AND PROCESSING MONITORING DATA RESULTING FROM CUSTOMIZED MONITORING OF SYSTEM ACTIVITIES

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 1052 days.

(21) Appl. No.: 12/898,428

(22) Filed: Oct. 5, 2010

(65) Prior Publication Data
US 2012/0084436 A1   Apr. 5, 2012

(51) Int. Cl.
G06F 15/173 (2006.01)
H04L 12/64 (2006.01)
G06F 11/34 (2006.01)

(52) U.S. Cl.
CPC ........ H04L 12/6418 (2013.01); G06F 11/3409 (2013.01); G06F 11/3495 (2013.01); G06F 11/3438 (2013.01); G06F 11/3476 (2013.01); G06F 11/3485 (2013.01); G06F 2201/815 (2013.01); G06F 2201/88 (2013.01)

(58) Field of Classification Search
CPC . H04L 12/2602; H04L 43/04; G06F 11/3003; G06F 11/3065
USPC .......................................... 709/202, 223, 224
See application file for complete search history.

(56) References Cited

U.S. PATENT DOCUMENTS

| 4,764,863 | A  |   | 8/1988  | Silverthorn et al.          |
|-----------|----|---|---------|----------------------------|
| 5,793,753 | A  | * | 8/1998  | Hershey et al. ...... 370/252 |
| 5,974,237 | A  | * | 10/1999 | Shurmer et al. ...... 709/224 |
| 6,085,243 | A  |   | 7/2000  | Fletcher et al.             |
| 6,093,215 | A  |   | 7/2000  | Buxton et al.               |
| 6,131,162 | A  |   | 10/2000 | Yoshiura et al.             |
| 6,282,712 | B1 |   | 8/2001  | Davis et al.                |
| 6,499,105 | B1 |   | 12/2002 | Yoshiura et al.             |
| 6,799,147 | B1 | * | 9/2004  | Balasubramanian et al. 702/186 |
| 6,918,038 | B1 |   | 7/2005  | Smith et al.                |
| 6,925,085 | B1 |   | 8/2005  | Krishna et al.              |
| 7,000,150 | B1 | * | 2/2006  | Zunino et al. ...... 714/38.11 |
| 7,162,638 | B2 |   | 1/2007  | Yoshihiro et al.            |

(Continued)

FOREIGN PATENT DOCUMENTS

WO    WO 2010020101    2/2010

OTHER PUBLICATIONS

Managing Network Monitor from the command line; Updated on Jan. 21, 2005; Microsoft; http://technet.microsoft.com/en-us/library/cc782726(v=ws.10).aspx.*

(Continued)

Primary Examiner — Madhu Woolcock
(74) Attorney, Agent, or Firm — Lowenstein Sandler LLP

(57) ABSTRACT

A mechanism for accessing and processing monitoring data resulting from customized monitoring of system activities. A method of embodiments of the invention includes invoking, via a Command-Line Interface (CLI) shell console, a performance monitor at a host computer system to perform monitoring of activities of a plurality of system components of one or more computer systems. The CLI shell console provides an abstraction layer for interfaces and further provides host performance information via a common interface independent of operating systems, monitoring use-cases, monitoring tools, or programming languages employed at the host computer system. The method further includes accessing monitoring data generated from monitoring of the activities by the performance monitor.

18 Claims, 13 Drawing Sheets

(56) References Cited

U.S. PATENT DOCUMENTS

| | | | |
|---|---|---|---|
| 7,171,021 B2 | 1/2007 | Yoshida et al. | |
| 7,246,156 B2 | 7/2007 | Ginter et al. | |
| 7,299,277 B1 | 11/2007 | Moran et al. | |
| 7,313,248 B2 | 12/2007 | Tonisson | |
| 7,398,307 B2* | 7/2008 | Dorland | 709/223 |
| 7,747,738 B2* | 6/2010 | Ellisor, Jr. | 709/224 |
| 7,779,119 B2 | 8/2010 | Ginter et al. | |
| 7,865,764 B2 | 1/2011 | Jester | |
| 7,975,045 B2* | 7/2011 | Underwood | 709/224 |
| 8,000,345 B2* | 8/2011 | Blackford et al. | 370/466 |
| 8,024,459 B2* | 9/2011 | Robbins et al. | 709/224 |
| 8,103,762 B2* | 1/2012 | Duberry | 709/224 |
| 8,145,742 B1 | 3/2012 | Parker et al. | |
| 8,185,651 B2 | 5/2012 | Moran et al. | |
| 8,219,663 B2 | 7/2012 | Faraldo, II | |
| 8,239,709 B2* | 8/2012 | Hom et al. | 714/38.1 |
| 8,254,698 B2 | 8/2012 | Kantor et al. | |
| 8,321,863 B2 | 11/2012 | Yamaguchi et al. | |
| 8,332,509 B2 | 12/2012 | Robertson et al. | |
| 8,413,144 B1* | 4/2013 | Manmohan et al. | 718/1 |
| 8,527,982 B1* | 9/2013 | Sapuntzakis et al. | 717/174 |
| 8,582,567 B2 | 11/2013 | Kurapati et al. | |
| 2001/0034839 A1 | 10/2001 | Karjoth et al. | |
| 2002/0059327 A1 | 5/2002 | Starkey | |
| 2002/0107958 A1 | 8/2002 | Faraldo, II | |
| 2002/0146123 A1 | 10/2002 | Tian | |
| 2002/0162059 A1* | 10/2002 | McNeely et al. | 714/703 |
| 2002/0165954 A1 | 11/2002 | Eshghi et al. | |
| 2003/0023963 A1 | 1/2003 | Birkholz et al. | |
| 2003/0233366 A1 | 12/2003 | Kesselman et al. | |
| 2005/0086195 A1 | 4/2005 | Tan et al. | |
| 2005/0160045 A1 | 7/2005 | Watanabe et al. | |
| 2005/0182969 A1 | 8/2005 | Ginter et al. | |
| 2005/0216830 A1 | 9/2005 | Turner et al. | |
| 2005/0256893 A1 | 11/2005 | Perry | |
| 2006/0005088 A1* | 1/2006 | Zeng et al. | 714/724 |
| 2006/0064486 A1 | 3/2006 | Baron et al. | |
| 2006/0085543 A1 | 4/2006 | Hrastar et al. | |
| 2006/0085790 A1 | 4/2006 | Hintermeister et al. | |
| 2006/0112175 A1 | 5/2006 | Sellers et al. | |
| 2006/0123133 A1 | 6/2006 | Hrastar | |
| 2006/0178918 A1 | 8/2006 | Mikurak | |
| 2006/0179058 A1 | 8/2006 | Bram et al. | |
| 2006/0179432 A1 | 8/2006 | Wallinga et al. | |
| 2006/0195886 A1 | 8/2006 | Ashley | |
| 2006/0218364 A1* | 9/2006 | Kitamura | 711/162 |
| 2006/0265625 A1 | 11/2006 | Dubois et al. | |
| 2007/0016429 A1 | 1/2007 | Bournas et al. | |
| 2007/0094367 A1* | 4/2007 | Esfahany et al. | 709/223 |
| 2007/0136024 A1* | 6/2007 | Moser et al. | 702/119 |
| 2007/0143338 A1 | 6/2007 | Wang et al. | |
| 2007/0294369 A1 | 12/2007 | Ginter et al. | |
| 2008/0028370 A1 | 1/2008 | Lewallen et al. | |
| 2008/0098454 A1 | 4/2008 | Toh | |
| 2008/0134340 A1 | 6/2008 | Ueda et al. | |
| 2008/0189546 A1 | 8/2008 | Yoon | |
| 2008/0208806 A1* | 8/2008 | Dalfo et al. | 707/3 |
| 2008/0209033 A1 | 8/2008 | Ginter et al. | |
| 2008/0275973 A1* | 11/2008 | Toeroe | 709/223 |
| 2008/0301803 A1 | 12/2008 | Ontaneda et al. | |
| 2009/0024994 A1* | 1/2009 | Kannan et al. | 718/1 |
| 2009/0077383 A1 | 3/2009 | de Monseignat et al. | |
| 2009/0199012 A1 | 8/2009 | Yamada et al. | |
| 2009/0199047 A1* | 8/2009 | Vaitheeswaran et al. | 714/47 |
| 2009/0265707 A1* | 10/2009 | Goodman et al. | 718/1 |
| 2009/0271504 A1 | 10/2009 | Ginter et al. | |
| 2009/0288084 A1* | 11/2009 | Astete et al. | 718/1 |
| 2009/0328143 A1 | 12/2009 | Ming | |
| 2010/0023598 A9 | 1/2010 | Ginter et al. | |
| 2010/0064039 A9 | 3/2010 | Ginter et al. | |
| 2010/0094981 A1 | 4/2010 | Cordray et al. | |
| 2010/0125844 A1* | 5/2010 | Mousseau et al. | 718/1 |
| 2010/0131638 A1* | 5/2010 | Kondamuru | 709/224 |
| 2010/0131769 A1 | 5/2010 | Homma | |
| 2010/0198875 A1 | 8/2010 | Rieger et al. | |
| 2010/0268957 A1 | 10/2010 | Suzuki et al. | |
| 2010/0322252 A1 | 12/2010 | Suganthi et al. | |
| 2010/0333172 A1 | 12/2010 | Jiang | |
| 2011/0145217 A1* | 6/2011 | Maunder et al. | 707/709 |
| 2011/0191351 A1 | 8/2011 | Chao et al. | |
| 2011/0209160 A1* | 8/2011 | Venkatachalam | 719/317 |
| 2011/0238792 A1 | 9/2011 | Phillips et al. | |
| 2011/0302651 A1 | 12/2011 | Bates et al. | |
| 2012/0011408 A1* | 1/2012 | Swamy et al. | 714/57 |
| 2012/0047194 A1 | 2/2012 | Stergiou et al. | |
| 2012/0084413 A1 | 4/2012 | Pasternak | |
| 2012/0084608 A1 | 4/2012 | Pasternak | |
| 2012/0084780 A1 | 4/2012 | Pasternak | |

OTHER PUBLICATIONS

Tulloch, Mitch, et al., "Tip: Use Windows PowerShell to Monitor System Performance", retrieved May 12, 2010 from TechNet Magazine http://technet.microsoft.com/en-us/magazine/ee872428.aspx, 1 page, excerpt from Windows 7 Resource Kit, published Oct. 7, 2009, Microsoft Corporation.

USPTO, Office Action for U.S. Appl. No. 12/898,480 mailed on Jun. 20, 2012.

USPTO, Final Office Action for U.S. Appl. No. 12/898,480 mailed on Jan. 3, 2013.

USPTO, Advisory Action for U.S. Appl. No. 12/898,480 mailed Mar. 14, 2013.

USPTO, Office Action for U.S. Appl. No. 12/898,526 mailed Mar. 19, 2013.

USPTO, Office Action for U.S. Appl. No. 12/898,582 mailed Jan. 18, 2013.

USPTO, Office Action for U.S. Appl. No. 12/898,526 mailed Nov. 5, 2013.

USPTO, Office Action for U.S. Appl. No. 12/898,582 mailed Oct. 11, 2013.

USPTO, Office Action for U.S. Appl. No. 12/898,480 mailed on Apr. 24, 2014.

USPTO, Final Office Action for U.S. Appl. No. 12/898,480 mailed on Nov. 17, 2014.

USPTO, Advisory Action for U.S. Appl. No. 12/898,480 mailed Feb. 19, 2015.

USPTO, Office Action for U.S. Appl. No. 12/898,480 mailed on May 6, 2015.

USPTO, Final Office Action for U.S. Appl. No. 12/898,526 mailed Jun. 3, 2014.

USPTO, Office Action for U.S. Appl. No. 12/898,526 mailed Oct. 1, 2014.

USPTO, Office Action for U.S. Appl. No. 12/898,582 mailed Apr. 30, 2015.

USPTO, Office Action for U.S. Appl. No. 12/898,526 mailed May 14, 2015.

* cited by examiner

```
Quest PLink
Mon,8/16/2010,11:38:56 AM < RedHat > $resultsTable.count
34
Mon,8/16/2010,11:38:59 AM < RedHat > $resultsTable[10]
Name                Value
----                -----
name                sar_B_pgscand/s
avg                 0
min                 0
ip                  10.35.
max                 0
stddev              0
normalized_name     sar_minus_B_pgscand_slash_s Mon,8/16/2010,11:39:03 AM < RedHat > $resultsTable[11]
Name                Value
----                -----
name                sar_B_pgscand/s
avg                 0
min                 0
ip                  10.35.
max                 0
stddev              0
normalized_name     sar_minus_B_pgsteal_slash_s Mon,8/16/2010,11:39:06 AM < RedHat > $resultsTable[12]
Name                Value
----                -----
name                sar_B_pgscand/s
avg                 70.88477169811321
min                 10.19
ip                  10.35.
max                 216
stddev              31.9661454693612
normalized_name     sar_minus_B_pgpgout_slash_s Mon,8/16/2010,11:39:16 AM < RedHat >
```

FIG. 7C

```
Quest PLink
Mon,8/16/2010,11:40:42 AM < RedHat > $resultsTable.count[12]

Name            Value
----            -----
name            sar_B_pgpgout/s
avg             70.8847169811321
min             10.19
ip              10.35.
max             216
stddev          31.9661454693612
normalized_name sar_minus_B_pgpgout_slash_s Mon,8/16/2010,11:40:43 AM < RedHat > $resultsTable[12].avg
70.8847169811321
Mon,8/16/2010,11:40:48 AM < RedHat > $resultsTable[12].min
10.19
Mon,8/16/2010,11:40:52 AM < RedHat > $resultsTable[12].max
216
Mon,8/16/2010,11:40:56 AM < RedHat > $resultsTable[12].stddev
31.9661454693612
Mon,8/16/2010,11:41:03 AM < RedHat > $resultsTable[12].name
sar_B_pgpgout/s
Mon,8/16/2010,11:41:07 AM < RedHat > _
```

FIG. 7D though the performance monitor. In one embodiment, the data access layer includes or provides an abstraction data access interface to facilitate, for example, manipulation of data (e.g., accessing and processing of monitoring data). This technique of having abstraction layers allows the user to avoid having to tediously navigate through the host machine's operating system to obtain monitoring data or spend an unreasonable amount of time on checking the consistency and reliability of the monitoring data, etc.

ACCESSING AND PROCESSING MONITORING DATA RESULTING FROM CUSTOMIZED MONITORING OF SYSTEM ACTIVITIES

RELATED APPLICATIONS

The present application is related to the co-filed U.S. patent application Ser. No. 12/898,480, entitled "Mechanism for Customized Monitoring of System Activities", U.S. patent application Ser. No. 12/898,526, entitled "Mechanism for Performing Verification of Template Integrity of Monitoring Templates Used for Customized Monitoring of System Activities", and U.S. patent application Ser. No. 12/898,582, entitled "Mechanism for Installing Monitoring Activities Utilities Using Universal Performance Monitor", which are assigned to the assignee of the present application.

TECHNICAL FILED

The embodiments of the invention relate generally to system monitoring and, more specifically, relate for providing a mechanism for accessing and processing monitoring data resulting from customized monitoring of system activities.

BACKGROUND

Monitoring tools are commonly available for monitoring system resources. However, a monitoring tool is limited to monitoring a specific resource (e.g., memory capacity) of a computer system. With each monitoring tool being predetermined and specific to a particular system resource and its activities, the process of system monitoring turns to be much more complicated, and even unmanageable, when activities relating to a great number of system resources require monitoring, and to make matters worse, activities of certain system components remain unmonitored due to not having a particular monitoring tool that can monitor those system components. For example, depending on a system, a user (e.g., system administrator) may have to use three different monitoring tools to monitor three different component-related activities (e.g., virtual machine speed, central processing unit (CPU) capacity, and memory capacity) and yet not have a monitoring tool to monitor network speed. Furthermore, these monitoring tools are inflexible in their monitoring tasks because their behavior, performance, assigned system component, etc., are rigidly predefined and unchangeable. Additionally, the task of manually accessing and processing monitoring data resulting from various monitoring projects is not only cumbersome to complete, but carries the potential of severe miscalculations, particularly when some of the monitoring projects can run for several days and produce large amounts of monitoring data over those days.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 7A illustrates an exemplary CLI-based display showing invocation of a performance monitor using a CLI shell console according to one embodiment of the invention;

FIG. 7B illustrates an exemplary CLI-based display showing data analysis and collection processes using a CLI shell console and a data access layer according to one embodiment of the invention;

FIG. 7C illustrates an exemplary CLI-based screenshot showing representation of monitoring data using a CLI shell console according to one embodiment of the invention;

FIG. 7D illustrates an exemplary CLI-based screenshot showing a results table that can be accessed and manipulated by a user according to one embodiment of the invention;

DETAILED DESCRIPTION

Embodiments of the invention provide a mechanism for accessing and processing monitoring data resulting from customized monitoring of system activities. A method of embodiments of the invention includes invoking, via a Command-Line Interface (CLI) shell console, a performance monitor at a host computer system to perform monitoring of activities of a plurality of system components of one or more computer systems. The CLI shell console provides an abstraction layer for interfaces and further provides host performance information via a common interface independent of operating systems, monitoring use-cases, monitoring tools, or programming languages employed at the host computer system. The method further includes accessing monitoring data generated from monitoring of the activities by the performance monitor.

The embodiments of the present invention are provided for directly accessing and processing monitoring data resulting from customized monitoring of system activities. In one embodiment, a shell console (e.g., CLI shell console) having an access interface is provided to accept command lines and other relevant monitoring information to allow the user to directly invoke (e.g., starting or stopping) a performance monitor capable of serving as a single universal monitoring tool facilitating the existing monitoring tools to perform monitoring tasks as defined by monitoring templates. Further, in one embodiment, a data processing entity is provided as an abstraction data access layer linked to the shell console to allow direct processing of monitoring data that is obtained from monitoring of system activities by, first, providing a direct access to monitoring data logs that hold the monitoring data.

Once the monitoring data is processed, the results obtained from the processed monitoring data may be displayed using the access interface of the shell console. These techniques eliminate the need for manually accessing the stored monitoring data logs and then, manually processing monitoring data contained in those data logs. These techniques are particularly useful when a user (e.g., system administrator, software developer, etc.) has to deal with a monitoring task that can run, continuously, for several days and produce monitoring data logs that are full of large amount of monitoring data, making it nearly impossible for the user to manually, and yet accurately, process all that monitoring data. In one embodiment, the CLI shell console is used to provide an abstraction layer for other shell consoles and interfaces, which is eligible to provide host performance information regardless and independent of the operating system, monitoring use-cases, and monitoring tools employed on the host computer system and represented by a common interface. This is so that any script or application written using any programming language for any shell console can use the same paradigms to access or monitor performance information of any host computer system.

Figure 1:
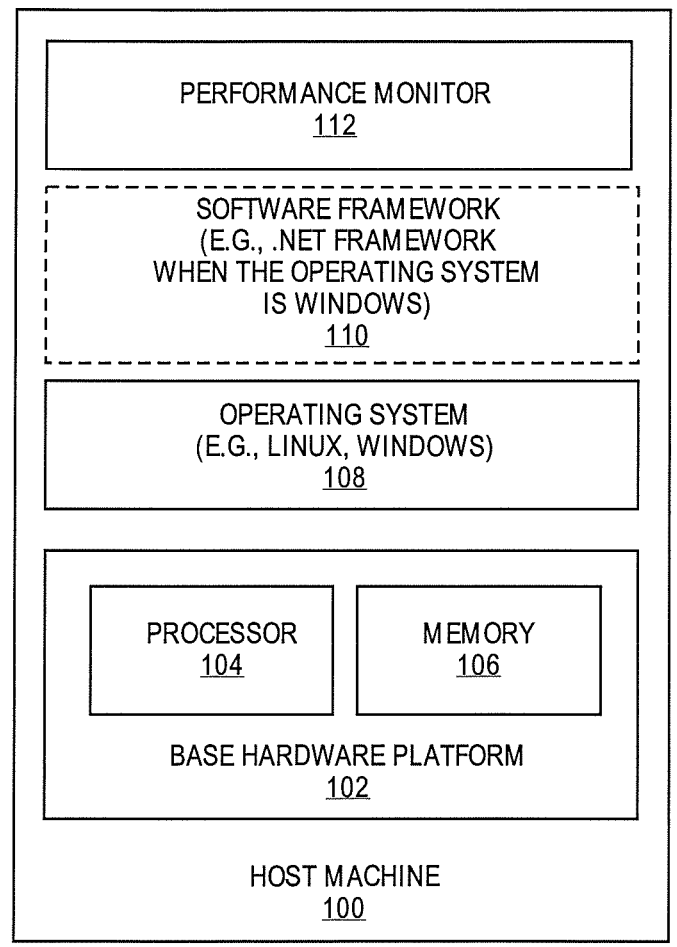
FIG. 1 is a block diagram of a host machine for employing a performance monitor for monitoring system activities according to one embodiment of the invention.

FIG. 1 is a block diagram of a host machine 100 for employing a performance monitor 112 for monitoring system activities according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and the user. In some embodiments, base hardware platform 102 may include a processor 104, memory devices 106, network devices, drivers, and so on. Throughout this document, for brevity and simplicity, Microsoft® Windows® and Linux® are used as examples of an operating system 108 that is capable of employing, supporting, and using a performance monitor 112. It is contemplated that performance monitor 112 is compatible with other operating systems. As illustrated here with reference to Windows and Linux, performance monitor 112 is compatible with components that are particular to an operating system 108, such as the well known Microsoft .NET® Framework is employed as a software framework 110 when the operating system 108 is Microsoft Windows, but it is not required when the operating system 108 is Linux. The terms "computer system" and "machine" are used interchangeably throughout this document.

Performance monitor 112 is a customizable monitoring tool that a user (e.g., system administrator, software developer) can customize and use to monitor various system activities as desired or necessitated. Performance monitor 112 represents a monitoring tool to provide a unique ability to monitor any type and/or number of system entities and their activities (e.g., physical machine activities, virtual machine activities). Further, the results of these system activities are directed to any location as specified in the relevant monitoring template, which may be different from a location specified in another monitoring template, or a single location may be specified within the configuration of performance monitor 112 (as opposed to in each monitoring template).

In one embodiment, performance monitor 112 provides monitoring templates that are capable of being customized to enable the performance monitor 112 to perform system monitoring tasks and other relevant functions in the manner as described in each monitoring template. This customization of the performance monitor 112 includes the ability to consolidate any number of monitoring tools so that the performance monitor 112 can serve as a single universal monitor. For example, instead of using three monitoring tools to monitor three different entities (e.g., virtual machine, memory, processor, etc.), a performance monitor template can be created and executed to have the performance monitor 112 act as a universal monitor (using the three monitoring tools) to monitor all three such entities. Although, as in this case, the three existing monitoring tools may still be used (by the performance monitor 112) to perform their respective monitoring tasks, the user has to handle only the universal monitor, i.e., the performance monitor 112. Similarly, performance monitor 112 can be customized to be used to monitor multiple activities (e.g., speed, capacity, etc.) of a single system entity (e.g., processor) or a single (e.g., speed) or multiple activities (e.g., speed, capacity) of multiple system entities (e.g., virtual machine, processor, etc.). Moreover, a monitoring template may be customized to create a new monitoring tool (as opposed to using an existing monitoring tool) that may not even be provided or supported by the operating system 108 to monitor a new system component, a new type of activity of an existing component, or in a new manner, etc. In one embodiment, a verification of template integrity of monitoring templates is provided. These monitoring templates are used for facilitating a performance monitor to serve as a universal monitor to perform customized monitoring of system activities of a computer system, such as host machine 100. Terms like "machine", "device" and "computer system" are used interchangeably throughout this document.

Figure 2:
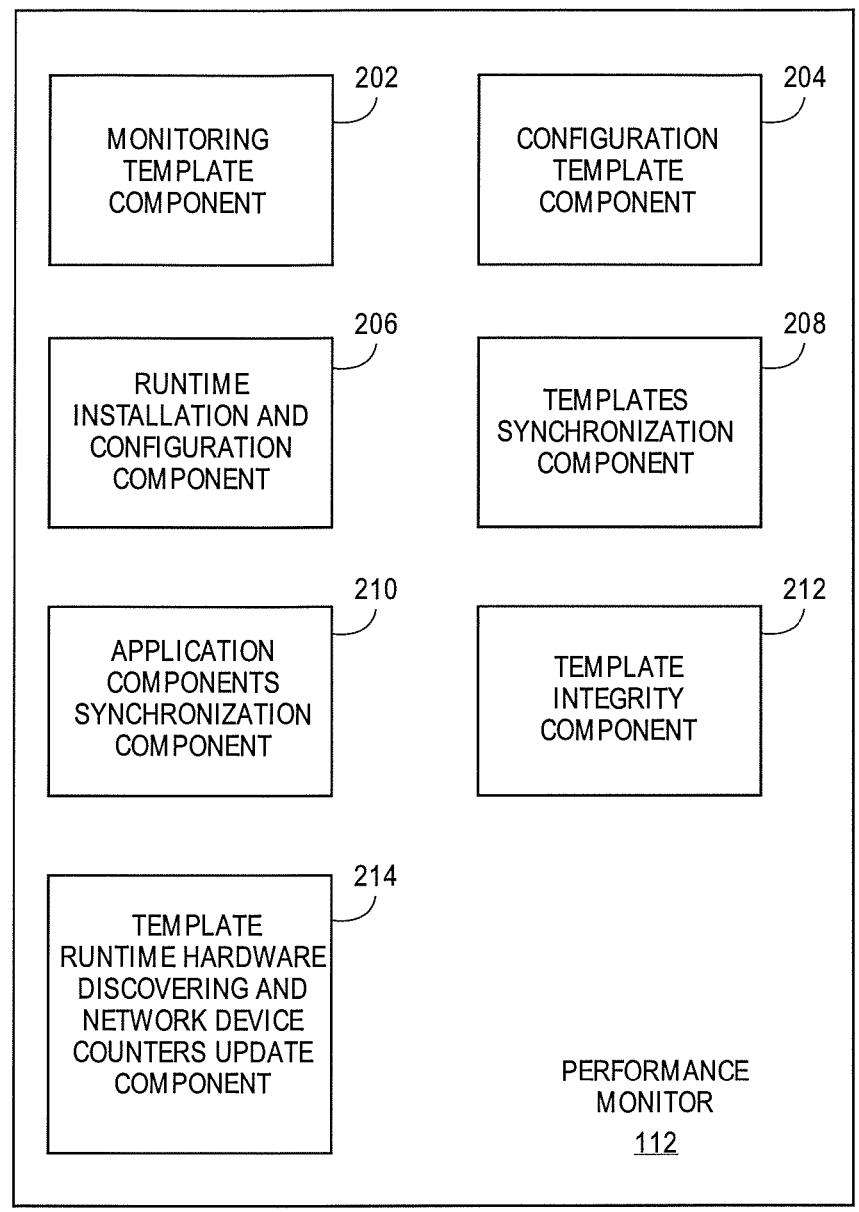
FIG. 2 illustrates a performance monitor according to one embodiment of the invention.

FIG. 2 illustrates a performance monitor 112 according to one embodiment of the invention. In one embodiment, performance monitor 112 includes a number of components 202-214 to perform various functionalities. Monitoring template component 202, as aforementioned, offers the ability to create and run customized monitoring templates to enable the performance monitor 112 to perform monitoring tasks according to the information defined these customized monitoring templates. For example, a monitoring template may be created for a single use and discarded, or saved and used multiple times immediately and/or subsequently. Further, in one embodiment, using monitoring template component 202, one or more customized monitoring templates are created to consolidate any number of existing monitoring tools in any combination, as desired or necessitated, to enable the performance monitor 112 to serve as a universal monitor to simplify the monitoring process and eliminate the need for the user to access and run a large number of individual monitoring tools. Aside from using the existing monitoring tools, monitoring template component 202 provides an additional ability to create and customize one or more monitoring templates to enable the performance monitor to serve a brand new monitoring tool to perform new or those system monitoring tasks for which a monitoring tool is not available at the machine.

Monitoring template component 202 provides the ability to create, run, use, and store monitoring use-case (through its monitoring templates) to include and mix and match any existing or new monitoring activities. Continuing with the Windows and Linux example, monitoring template component 202 enables its monitoring templates to be compatible with, for example, both Linux and Windows operating systems so that their system activities can be seamlessly monitored according to the rules and requirements of each operating system. Further, monitoring templates may be used to specify a system location (e.g., repository, storage device, display device) where the results of monitoring system activities are forwarded. In one embodiment, each monitoring template includes one or more specific locations for monitoring results of one or more specific system activities or, in another embodiment, a default location is defined within the configuration of performance monitor 112 itself or by a combination thereof.

Configuration template component 204 allows the user to predefine monitoring configuration in each monitoring template for each use-case independently so that each use-case can be executed according to a custom configuration as defined by the user. For example, the user may choose to define a particular configuration (that is compatible with the operating system, such as Linux, Windows) in a monitoring template so that the monitoring template can facilitate the performance monitor 112 to perform its monitoring tasks according to the defined configuration as opposed to a default configuration or a configuration that is the same as another configuration.

Runtime installation and configuration component 206 provides the necessary ability to install and configure remotely any monitoring template utility so that the performance monitor 112 is able to perform new monitoring tasks of one or more monitoring tools that may not exist or be supported by the operating system. In other words, runtime installation and configuration component 206 helps create and install a new monitoring tool that does not exist on the machine (such as it is not provided by the operating system (e.g., Linux) installed on that machine). Further, the tasks of creating and installing a new monitoring tool may be performed remotely between two or more machines.

Templates synchronization component 208 supports updating and synchronization of any changes made to an existing version of a monitoring template provided by the performance monitor 112. In one embodiment, a storage or repository (e.g., template version repository) and its location (e.g., on a host machine) are defined within, in one embodiment, the configuration of the performance monitor 112 (or, in another embodiment, of each template) such that each time a monitoring template is updated (e.g., another monitoring activity is added to it, monitoring time period is reduced, etc.), the updated monitoring template is saved at the defined repository and, at the time of its use, is synchronized with other machines across the board (e.g., other machines being used by the user). This way, each time a user triggers the use of a monitoring template on a machine (the same machine where previously used or installing and/or using on another machine), the defined repository is accessed for template version verification so that the user gets to load and use the most recent version of the monitoring template.

Application components synchronization component 210 provides updating and synchronization of any configuration changes, version updates, etc., made to the performance monitor 112 itself. A storage or repository (e.g., performance monitor version repository) and its location (e.g., on a host machine) are defined within the configuration of the performance monitor 112. Any updates made to the performance monitor 112 are communicated across the board to each machine that loads or uses the performance monitor 112. It is to be noted that in this case, the update and synchronization refers to the any updates (e.g., adding a new component) made to the performance monitor 112 itself as opposed to its monitoring templates. In other words, machine A and machine B use the same version of performance monitor 112 but each may use an entirely different set of monitoring templates (such as according to their separate monitoring needs). In case of an update to the performance monitor 112, that update is communicated to both machines A and B so each machine can have the most recent version of the performance monitor 112.

Template integrity component 212 relates to integrity and security of monitoring templates. As a monitoring template is created, a hash code for that monitoring template is calculated and saved. When the same monitoring template is loaded to be used, a hash code of the monitoring template is recalculated and compared to the hash code previously calculated and saved. If the two hash codes match, the monitoring template is allowed to be loaded and used. If the two hash codes do not match, the monitoring template is considered corrupt and the user is notified of its corruption.

Template runtime hardware discovering and network device counters update component ("hardware discovery component") 214 automatically detects new hardware setting and enables performance monitor 112 to adjust according to the new or available hardware setting. For example, a monitoring template has embedded in it hardware information regarding a network interface of a first device, but when it is executed on a second device having a different network interface, hardware discovery component 214 automatically and in runtime searches and investigates the network interface of the second device and, accordingly, adjusts the performance monitor 112 making it compatible with the change. For instance, in case of a Windows-based system, at the time of creating a monitoring template, the installed hardware devices of a first machine where the monitoring template is created (and executed) are known and defined in the monitoring template, but when this monitoring template is installed on a second machine, the new devices of this second machine are not likely to be defined in the monitoring template. In this case, performance monitor 112 may use its hardware discovery component 214 to automatically and in runtime discover the devices of the second system and update the information in the monitoring template without any interruption. In case of network-related devices, hardware discovery component 214 investigates the new devices and updates counter at runtime without interrupting the monitoring use case associated with the monitoring template.

Figure 3:
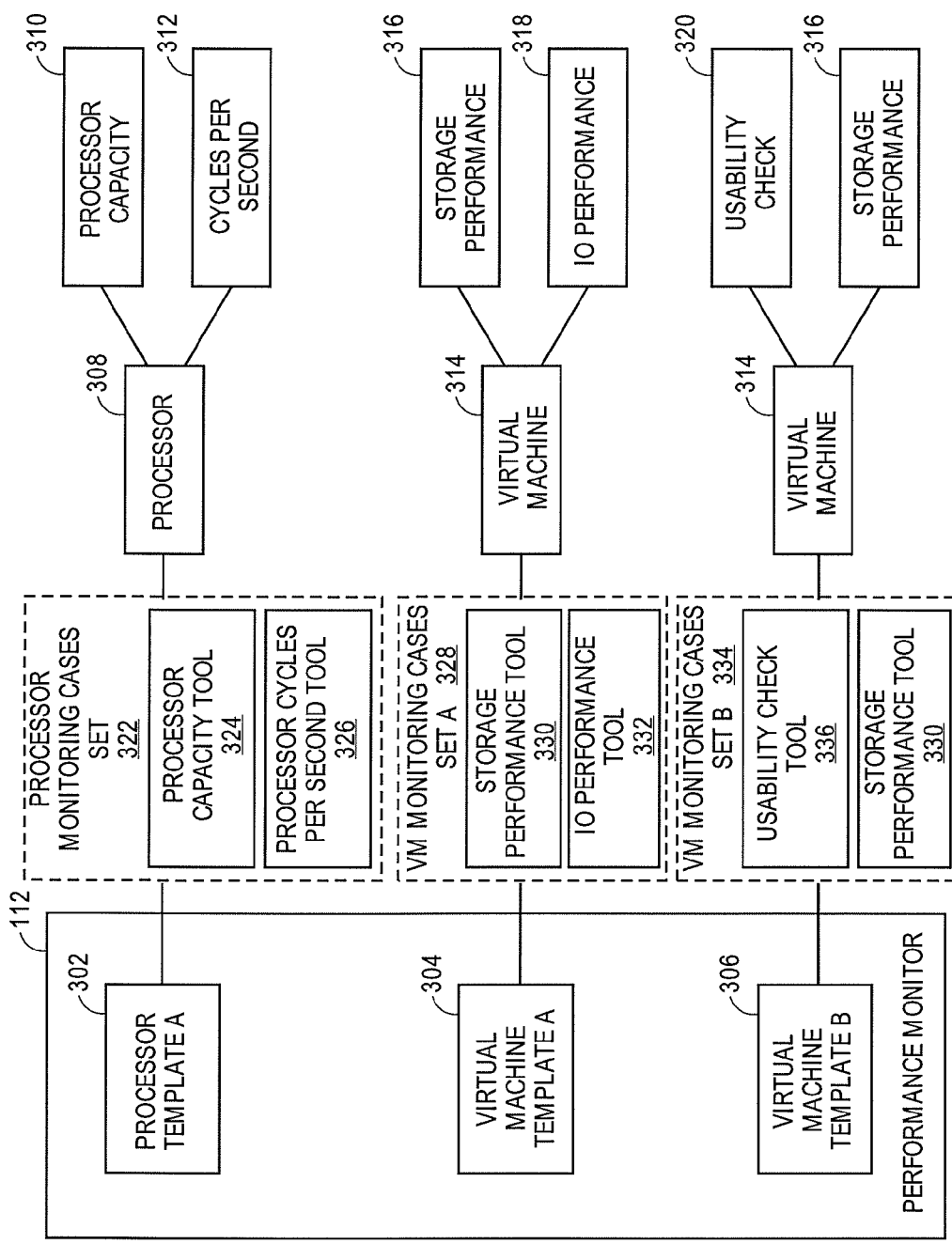
FIG. 3 illustrates monitoring system activities using a performance monitor according to one embodiment of the invention.

FIG. 3 illustrates monitoring system activities using a performance monitor 112 according to one embodiment of the invention. In one embodiment, performance monitor 112 uses a number of monitoring templates 302-306 to serve as a universal monitoring tool or a virtual monitoring tool to consolidate various monitoring tools 324-326, 330-332, 336 are facilitated to perform various monitoring tasks of system activities 310-312, 316-320. In the illustrated embodiment, three monitoring templates, processor template A 302, virtual machine template B 304, and virtual machine template B 306, are created and executed using the performance monitor 112. For simplicity, let us suppose, processor capacity 310 and cycles per second 312 are two different processor activities that are monitored by two separate, but existing, monitoring tools 324, 326. In this case, the user, using processor template A 302, combines or consolidates the two separate monitoring tools, such as processor capacity tool 324 and processor cycles per second tool 326, into a single processor monitoring set, such as processor monitoring cases set 322, to perform monitoring of processor capacity 310 and processor cycles per second 312, relating to processor 308.

Similarly, using virtual machine template A 304, two monitoring tools, storage performance tool 330 and input/output ("I/O") performance tool 332, are combined or consolidated as virtual machine monitoring cases set A 328 to serves as a monitoring set to monitor system activities of virtual machine storage performance 316 and I/O performance 318 of virtual machine 314. Now, let us suppose, the user wishes to continue to monitor virtual machine storage performance 316 of virtual machine 314, but this time it is to be done while checking the usability 320 of virtual machine 314. For performing these monitoring tasks, the user creates and executes, via performance monitor 112, another monitoring template, such as virtual machine template B 306, to combine storage performance tool 330 and usability check tool 336 to monitor virtual machine storage performance 316 and the virtual machine's 314 usability check 320, respectively.

Stated differently, in one embodiment, using (e.g., by creating and executing) various monitoring templates 302-306, the monitoring capacities of various monitoring tools 324-326, 330-332, 336 are absorbed by consolidating these monitoring tools 324-326, 330-332, 336 in various combinations. For example, as illustrated, a monitoring template 302 is generated to contain the capacity of one or more monitoring tools 324, 326 by consolidating these monitoring tools 324, 326 into a single virtual monitoring tool 322 to perform monitoring tasks (e.g., monitoring system activities 310, 312) of these monitoring tools 324, 326, respectively, using performance monitor 112. These monitoring templates 302-306 are then executed to have performance monitor 112 serve or act as a universal or virtual monitoring tool, through consolidated monitoring tools 322, 328, 334, to facilitate the various monitoring tools 324-326, 330-332, 336 to perform their corresponding monitoring tasks 310-312, 316-318, 320.

Figure 4:
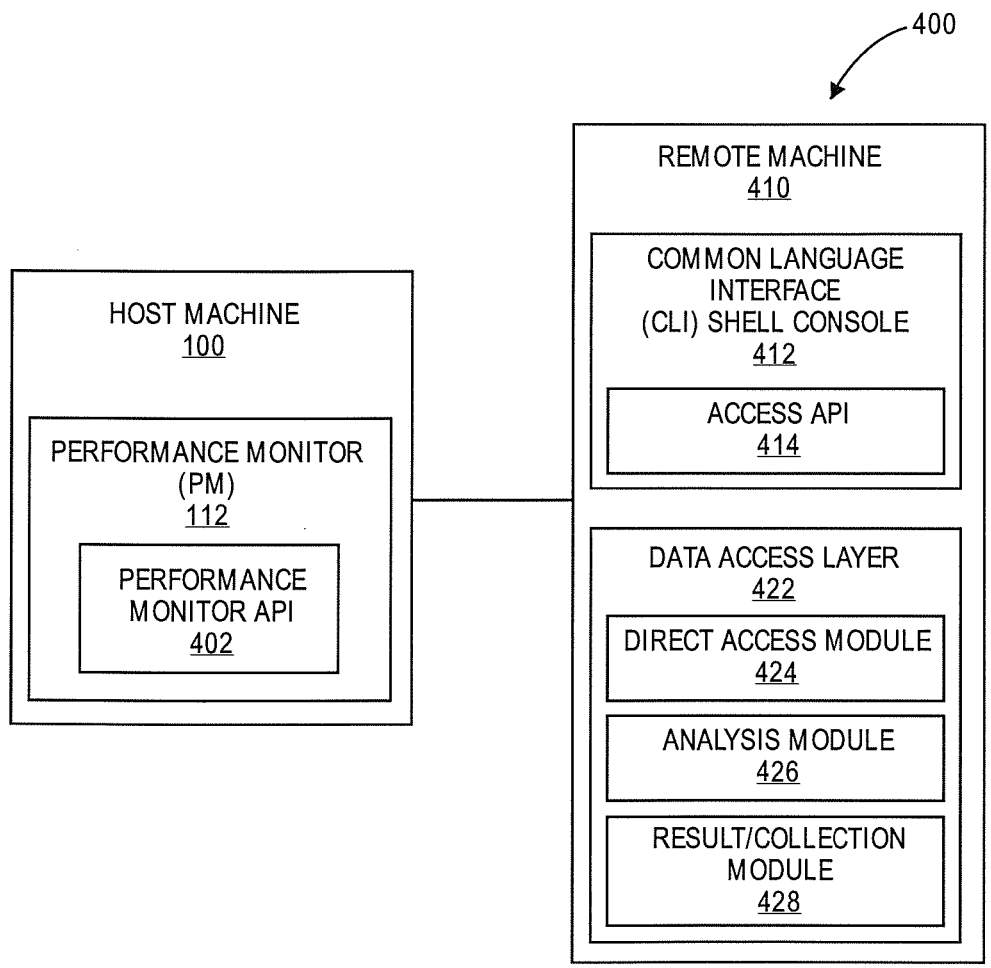
FIG. 4 illustrates a mechanism for invoking a performance monitor and directly accessing and processing monitoring data resulting from performance of monitoring tasks according to one embodiment of the invention.

FIG. 4 illustrates a mechanism 400 for invoking a performance monitor and directly accessing and processing monitoring data resulting from performance of monitoring tasks according to one embodiment of the invention. In one embodiment, a CLI shell console 412 having an access application programming interface ("API" and also referred to as "interface") 414 is provided at a remote machine 410 to access a performance monitor 112 at a host machine 100 over a network. The performance monitor 112 includes a performance monitor interface 402 to maintain a communication link with the access interface 414 of the CLI shell console 412. Associated with the CLI shell console 412, in one embodiment, is a data access layer 422 that can be provided as an abstraction layer to access and process the monitoring data relating to and/or obtained from monitoring cases that are performed by the performance monitor 112. Although the CLI shell console 412 and the data access layer 422 are shown here as residing on a single remote machine 410, it is contemplated that they may be provided on multiple remote machines and/or on the same host machine 100 where the performance monitor 112 resides.

In one embodiment, the data access layer 422 includes a direct access module 424 to directly access the monitoring data (such as in the form of monitoring data logs) that is generated from monitoring cases being performed by the performance monitor 112. Once the monitoring data is accessed, it is then analyzed by the analysis module 426 as requested by a user or based on predetermined criteria, disclosed potential uses of the monitoring data, etc. The result/collection module 428 of the data access layer 422 is then used to collect results of the analyzed monitoring data and provides such results to the user via the access API 414 of the CLI shell console 412. It is contemplated that the CLI shell console 412 may differ according to the operating system, software framework, programming language, etc., employed at the host machine 100 and/or the remote machine 410. For example, the CLI shell console 412 may include a Power-Shell® console to work with Microsoft Windows, while a Python® shell console may be used if the operating system is Linux, etc. Further, each of the two machines 100, 410 may include a server computer system or a client computer system and be in communication with each other over a network, such as a Wide Area Network (WAN), a Local Area Network (LAN), the Internet, or the like.

Figure 5A:
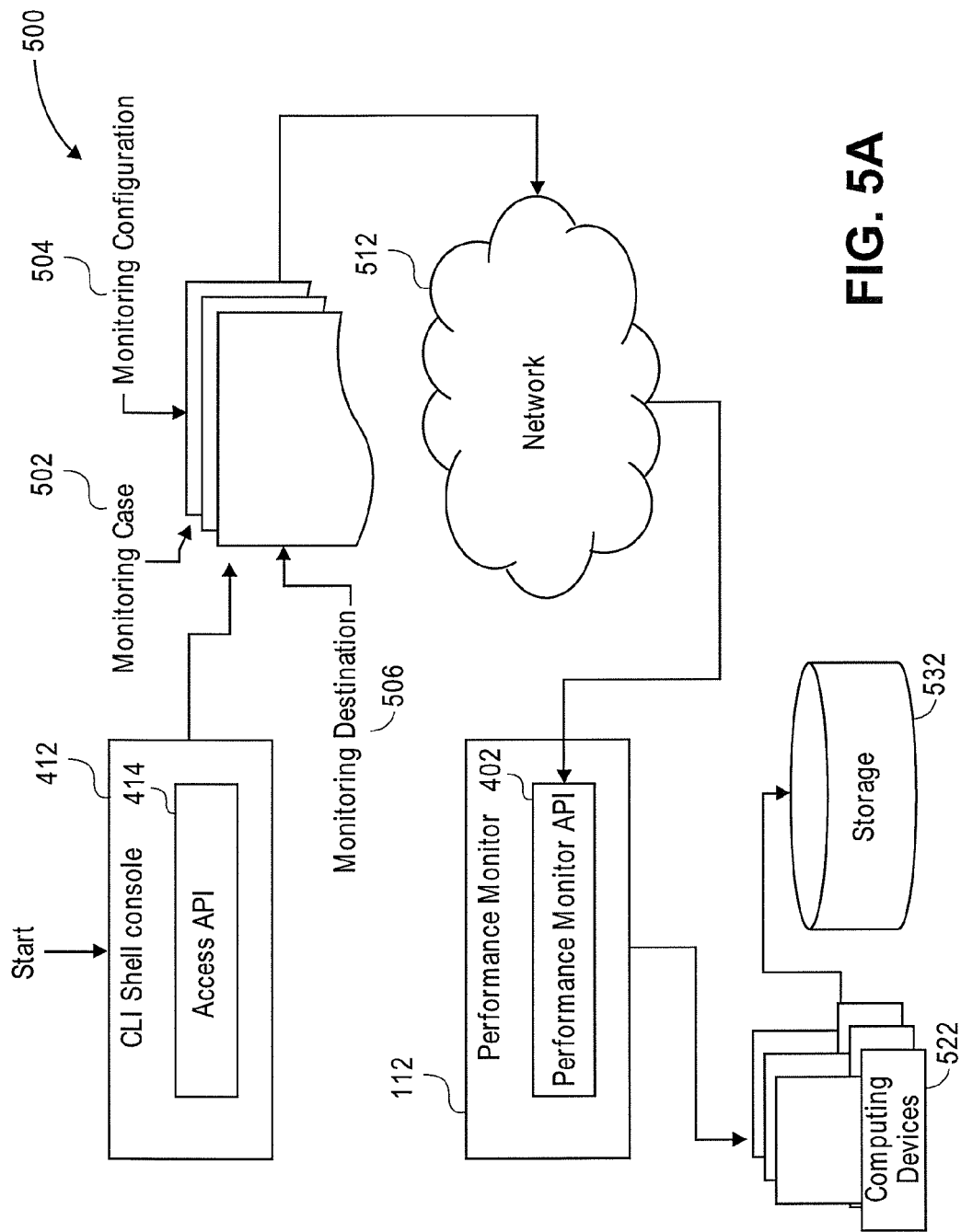
FIG. 5A illustrates a mechanism for invocating a performance monitor using a Command-Line Interface shell console according to one embodiment of the invention.

FIG. 5A illustrates a mechanism for invoking a performance monitor using a CLI shell console according to one embodiment of the invention. In one embodiment, mechanism 500 is initiated with the user using an access interface 414 of the CLI shell console 412 enters an invocation command (e.g., start command) to start the performance monitor 112. In addition to the invocation command, using the CLI shell console 412, relevant monitoring information (such as monitoring cases 502, monitoring configurations 504, monitoring destination 506, etc.) is provided to the performance monitor 112 to run the requested monitoring cases 502 of certain activities of specified entities (e.g., processor, memory, virtual machine, etc.) on one or more computer devices 522. Monitoring cases 502 refer to the monitoring cases 322, 328, 334 explained with reference of FIG. 3. Monitoring configurations 504 refer to monitoring configuration templates, such as the monitoring configuration templates 302, 304, 306 of FIG. 3. Monitoring destinations refer to Internet Protocol (IP) addresses of one or more computer devices 522 where the monitoring cases 502 are to be performed.

In one embodiment, upon receiving the relevant monitoring information and the invocation command, over a network 512 and via the performance monitor interface 402, the performance monitor 112 initiates these monitoring cases 502 at the computer devices 522. Further, a monitoring data log of the monitoring data is prepared and stored at a storage device 532 that may be connected to the computer device employing the performance monitor 112.

Figure 5B:
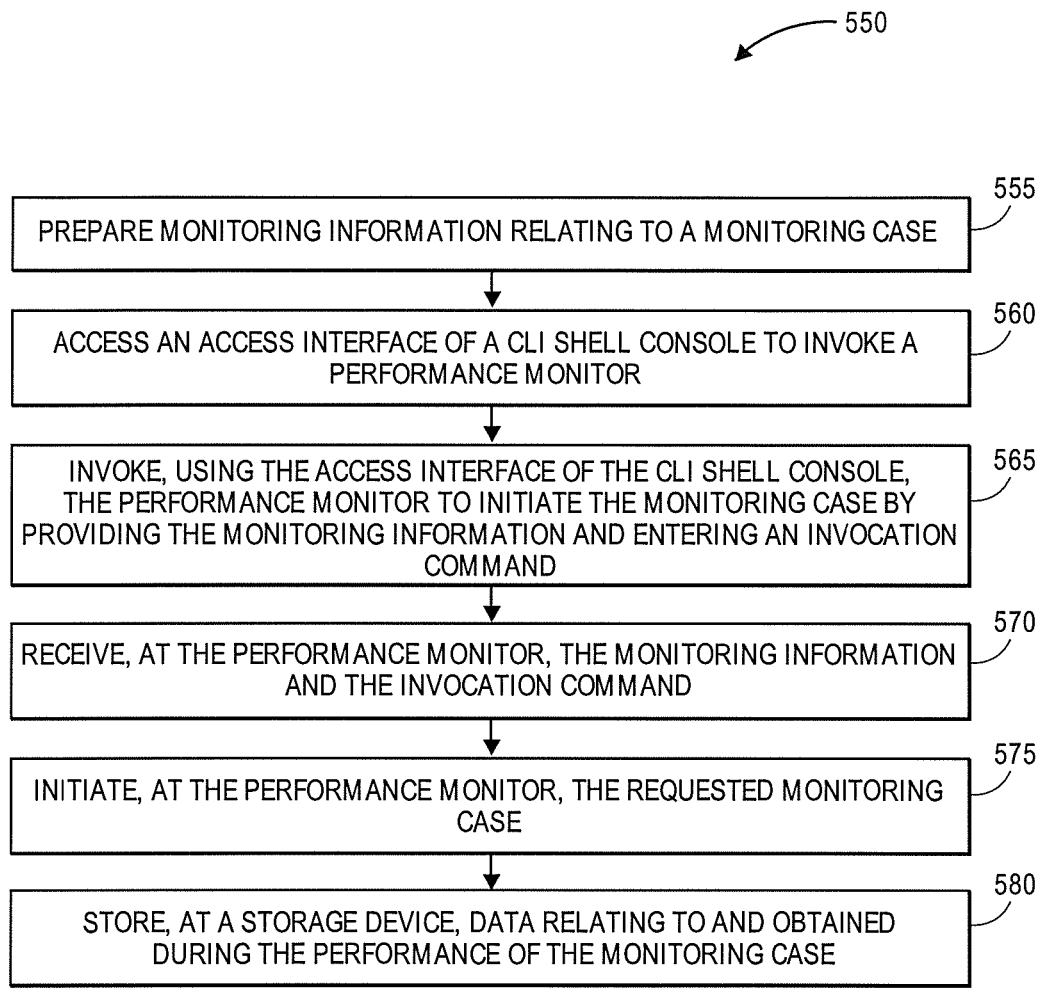
FIG. 5B illustrates a method for invoking a performance monitor using a Command-Line Interface shell console according to one embodiment of the invention.

FIG. 5B illustrates a method for invoking a performance monitor using a CLI shell console according to one embodiment of the invention. Method 550 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 550 is performed by performance monitor, CLI shell console, and data access layer of FIG. 4.

In one embodiment, at block 555, relevant monitoring information (e.g., a monitoring case, a monitoring configuration, a monitoring destination, etc.) is prepared. An access interface of the CLI shell console is accessed to invocate (e.g., start) the performance monitor at block 560. At block 565, an invocation command (e.g., start command) and the relevant monitoring information are provided through the access interface of the CLI shell console to the performance monitor through its performance monitor interface over a network. At block 570, the performance monitor receives the start command and the monitoring information. At block 575, in response to the start command, the performance monitor initiates the requested monitoring cases at a number of specified computer systems based on the monitoring information. At block 580, data relating to or obtained during the performance of monitoring cases is stored at a storage device coupled with the host computer system employing the performance monitor.

Figure 6A:
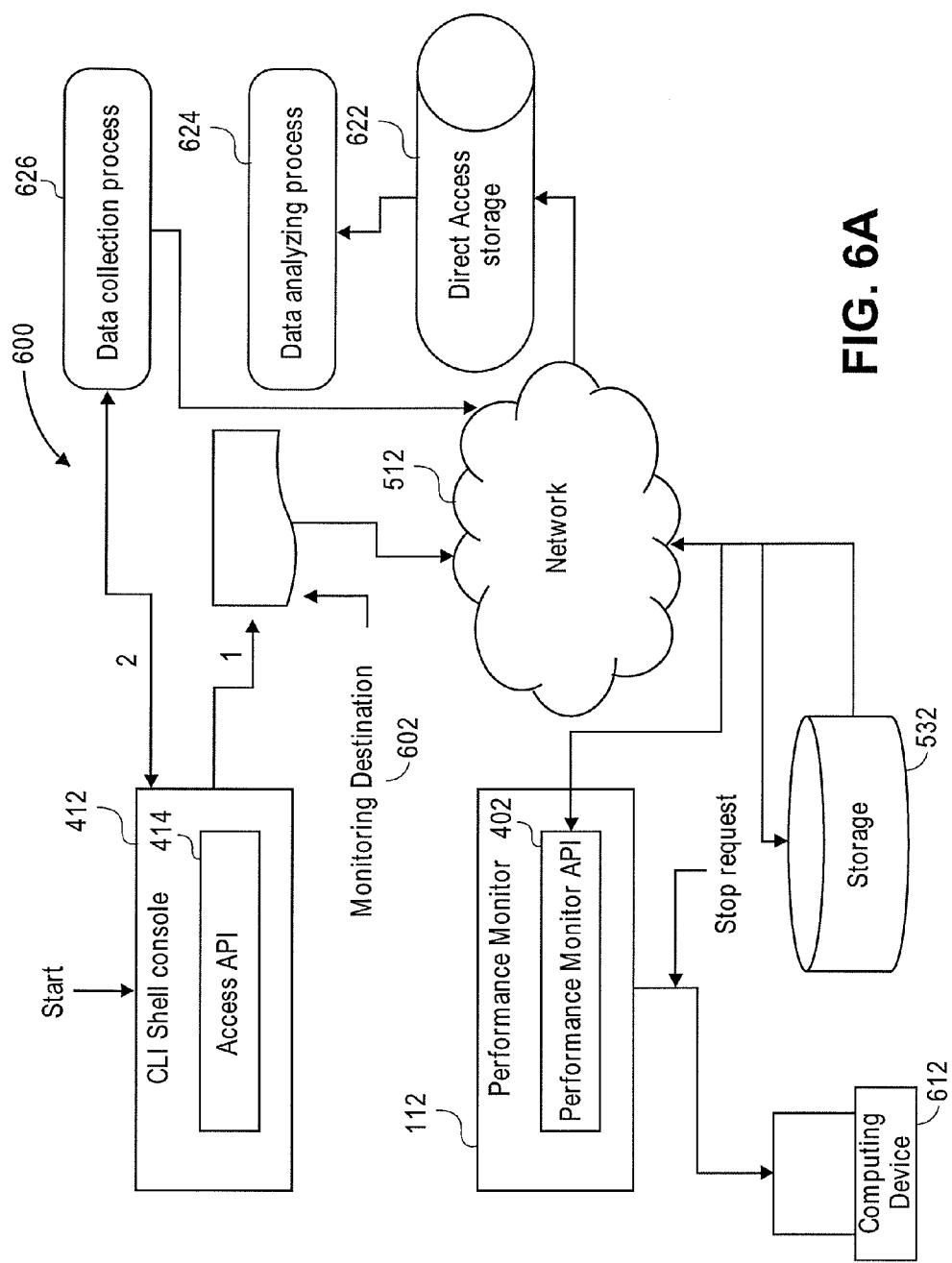
FIG. 6A illustrates a mechanism for accessing and processing monitoring data using a CLI shell console and a data access layer according to one embodiment of the invention.

FIG. 6A illustrates a mechanism for accessing and processing monitoring data using a CLI shell console and a data access layer according to one embodiment of the invention. In one embodiment, mechanism 600 is initiated when a user, using an access interface 414 of the CLI shell console 412, requests stopping a particular monitoring case being performed by a performance monitor 112. For example, the user may access the access API to enter a stop command along with other relevant monitoring information (such as the monitoring destination 602 that includes the IP address of the target computer device 612) to stop the monitoring case being run on the computer device 612. In one embodiment, this monitoring information and the stop command are received at the performance monitor 112 through its performance monitor interface 402 over a network 512. It is contemplated that the CLI shell console 412 and the performance monitor 112 may be employed on the same computer system. The stop request is received at the performance monitor 112 and, in response to the stop request, the monitor case is terminated.

Although a monitoring data log having the monitoring data relating to the stopped monitoring case may be saved at a storage device 532, in one embodiment, using a direct access module of the data access layer, the monitoring data log is directly accessed at a direct access storage 622 (e.g., temporary computer memory, Random Access Memory (RAM), etc.). Using an analysis module of the data access layer, the monitoring data is then analyzed 624 as requested by a user or based on predetermined criteria, a future use plan for the monitoring data, etc. Then, in one embodiment, using a result/collection module of the data access layer, a data collection process 626 is initiated to collect results obtained from monitoring data analysis. The collected results are then provided to the user using the access interface 414 of the CLI shell console 412.

Figure 6B:
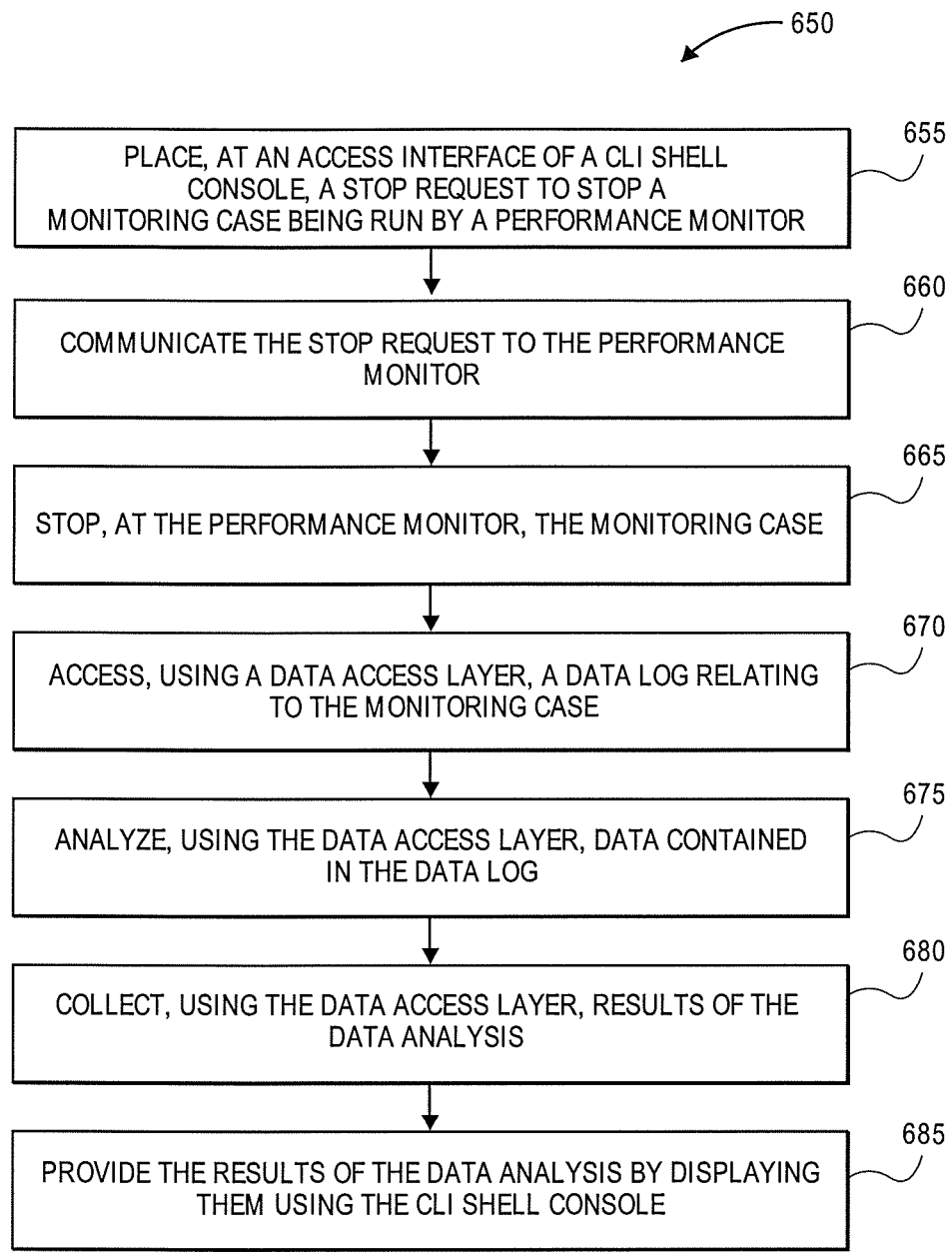
FIG. 6B illustrates a method for accessing and processing monitoring data using a CLI shell console and a data access layer according to one embodiment of the invention.

FIG. 6B illustrates a method for accessing and processing monitoring data using a CLI shell console and a data access layer according to one embodiment of the invention. Method 650 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 650 is performed by performance monitor, CLI shell console, and data access layer of FIG. 4.

At block 655, a stop request for stopping an on-going monitoring case is placed by a user using an access interface of the CLI shell console. The stop request includes a stop command as well as certain relevant monitoring information, such as a monitoring destination (e.g., IP address of the computer device where the monitoring case is being performed, monitoring case), monitoring case (e.g., monitoring case name, credentials), monitoring configuration (e.g., monitoring template), etc. At block 660, the stop request is communicated to the performance monitor over a network and via a performance monitor interface associated with the performance monitor. At block 665, in response to the stop request, the performance monitor stops the particular monitoring case.

Although a monitoring data log having the monitoring data relating to the stopped monitoring case may be saved at a storage device, in one embodiment, at block 670, using a direct access module of the data access layer, the monitoring data log is directly accessed at a direct access storage. At block 675, using an analysis module of the data access layer, the monitoring data is analyzed as requested by a user or based on predetermined criteria, a future use plan for the monitoring data, etc. Then, at block 680, in one embodiment, using a result/collection module of the data access layer, a data collection process is initiated to collect results obtained from monitoring data analysis. The collected results are then provided to the user using the access interface of the CLI shell console at block 685.

Figures 7A, 7B:
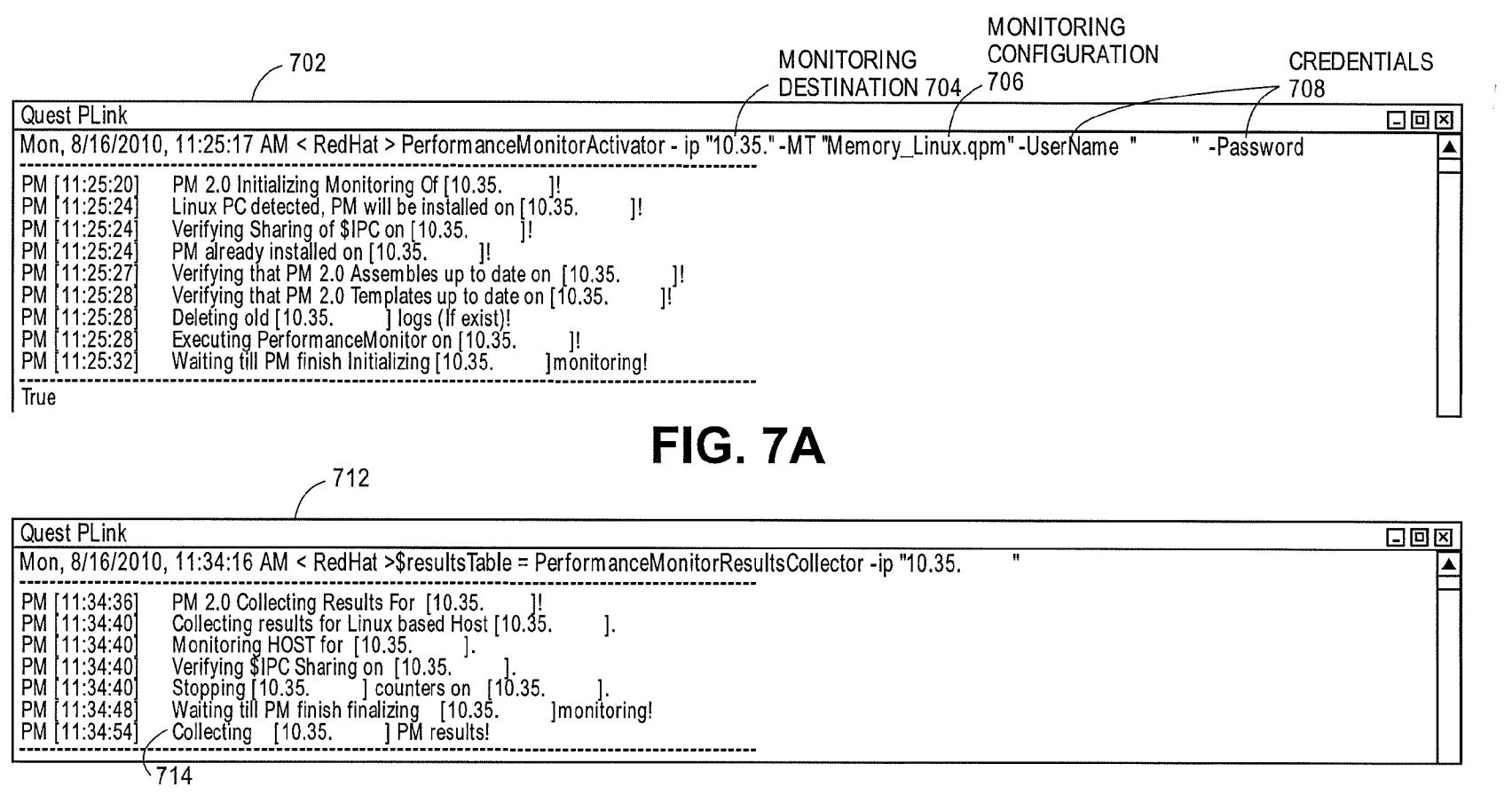

FIG. 7A illustrates an exemplary CLI-based display showing invocation of a performance monitor using a CLI shell console according to one embodiment of the invention. CLI-based display 702 references the mechanism and process of FIGS. 5A and 5B, respectively, illustrating start of a performance monitor using an invocation request (e.g., a start request including a start command and monitoring information) to initiate and run a monitoring case. As aforementioned, the start request may include a start command as well as other relevant monitoring information, such as monitoring destination 704 (e.g., IP address of the target computer system where the monitoring case is to be performed), monitoring configuration 706 (e.g., monitoring template relating to the monitoring case), user and/or system credentials 708 (e.g., username, password, etc.), etc.

FIG. 7B illustrates an exemplary CLI-based display showing data analysis and collection processes using a CLI shell console and a data access layer according to one embodiment of the invention. CLI-based display 712 references the data analysis and collection mechanism and process of FIGS. 6A and 6B, respectively. As illustrated, results obtained from performing data analysis of monitoring data relating to a monitoring case are collected 714 and displayed using the CLI shell console.

FIG. 7C illustrates an exemplary CLI-based screenshot showing representation of monitoring data using a CLI shell console according to one embodiment of the invention. CLI-based display 722 displays the results of various monitoring cases 724, 726, 728 performed by a performance monitor. Each set of results relating to particular monitoring case, such as monitoring case 728, provides certain information about the monitoring case, such as the name 730 of the monitoring case 728, another name 732 by which the monitoring case 728 may be saved in a database, the IP address 734 of the target computer system where the monitoring case 728 ran, and the like.

FIG. 7D illustrates an exemplary CLI-based screenshot showing a results table that can be accessed and manipulated by a user according to one embodiment of the invention. As illustrated, a results table of a monitoring case 728 is displayed. This information may be used and manipulated, as necessitated or desired, and ordered to be displayed as commanded by the user using the a CLI shell console, such as entering a command via an access interface of the CLI shell console requesting a particular segment of the results, such as the average 746 of the monitoring case 728.

Figure 8:
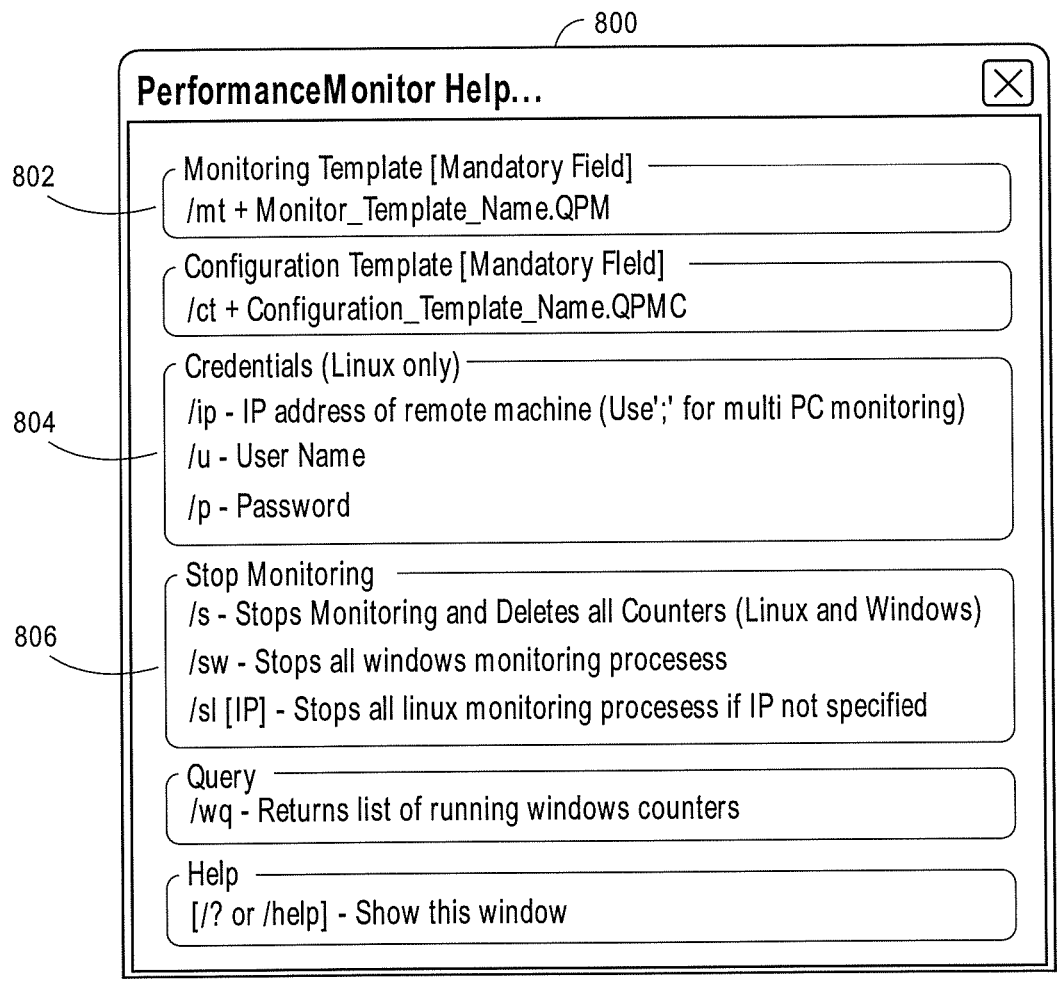
FIG. 8 illustrates a CLI-based display according to one embodiment of the invention.

FIG. 8 illustrates a CLI-based display according to one embodiment of the invention. CLI-based display 800 provides a CLI-based access interface to, for example, accept command lines and monitoring information to start or stop a performance monitor. For example, sections 802, 804 and 806 illustrate exemplary command lines for selecting a monitoring template, providing credentials, and initiating a stop request to stop the performance monitor, respectively.

Figure 9:
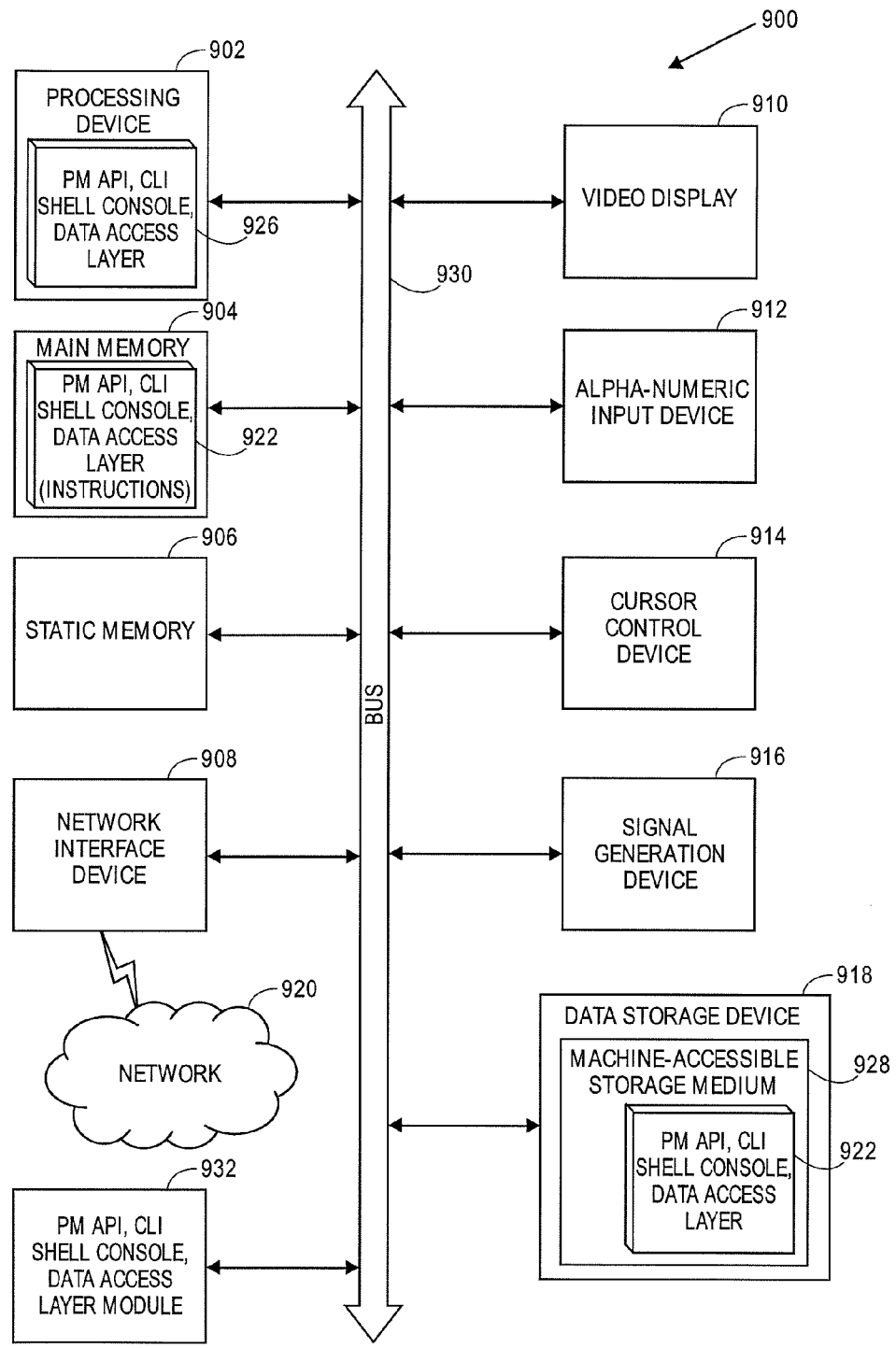
FIG. 9 illustrates a block diagram illustrating one embodiment of a computer system.

FIG. 9 illustrates a computer system 900 for employing a performance monitor, a CLI shell console, and a data access layer according to one embodiment of the invention. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, RAM, dynamic RAM (DRAM) such as synchronous DRAM (SDRAM), DRAM (RDRAM), etc.), a static memory 906 (e.g., flash memory, static random access memory (SRAM), etc.), and a secondary memory 918 (e.g., a data storage device in the form of a drive unit, which may include fixed or removable machine-accessible or computer-readable storage medium), which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic 926 for performing the operations and methods discussed herein.

The computer system 900 may further include a network interface device 908. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 916 (e.g., a speaker).

The data storage device 918 may include a machine-accessible storage medium (or a computer-readable storage medium) 928 on which is stored one or more sets of instructions 922 (e.g., performance monitor API, CLI shell console, and data access layer component) embodying any one or more of the methodologies or functions described herein. The performance monitor API, CLI shell console, and data access layer component may also reside, completely or at least partially, within the main memory 904 (e.g., performance monitor API, CLI shell console, and data access layer component (instructions) 922) and/or within the processing device 902 (e.g., performance monitor API, CLI shell console, and data access layer component (processing logic) 926) during execution thereof by the computer system 900, the main memory 904 and the processing device 902 also constituting machine-readable storage media. Further, for example, the performance monitor API, CLI shell console, and data access layer component instructions 922 may be transmitted or received over a network 920 via the network interface device 908.

The machine-readable storage medium 928 may also be used to store the performance monitor API, CLI shell console, and data access layer component (instructions) 922 persistently. While the machine-accessible storage medium 928 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Performance monitor API, CLI shell console, and data access layer component modules 932, components and other features described herein (for example in relation to FIG. 1) can be implemented as discrete hardware components or integrated in the functionality of hardware components such as ASICS, FPGAs, DSPs or similar devices. In addition, the modules 932 can be implemented as firmware or functional circuitry within hardware devices. Further, the modules 932 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "preparing", "accessing", "invoking", "starting", "stopping", "saving", "storing", "receiving", "initiating", "monitoring", "placing", "communicating", "accessing", "analyzing", "collecting", "providing", "facilitating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   invoking, using a start command via a Command-Line Interface (CLI) shell console, a universal performance monitor at a host computer system,
   wherein the host computer system is remote from the CLI shell console and is associated with a plurality of monitoring tools according to information defined in user customized monitoring templates that consolidate the plurality of monitoring tools to perform monitoring of activities of a plurality of system components of one or more computer systems hosting a plurality of virtual machines,
   wherein the CLI shell console provides an abstraction layer to access and process monitored data received from the universal performance monitor and further provides host performance information via a common interface to the host computer system independent of operating systems, monitoring use-cases, monitoring tools, or programming languages employed at the host computer system, and
   wherein the activities to be monitored pertain to one or more processors, memory and virtual machines on the one or more computer systems;
   in response to a stop command requesting to stop the monitoring of the activities, initiating stopping, by a processing device executing the CLI shell console, of the monitoring of the activities by the universal performance monitor; and
   causing display, by the CLI shell console, of the monitored data received by the abstraction layer, wherein the monitored data is generated from the monitoring of the activities by the universal performance monitor.

2. The computer-implemented method of claim 1, wherein the universal performance monitor serves as a universal monitoring tool to facilitate the monitoring by the plurality of monitoring tools of the activities of the plurality of system components, wherein invoking comprises:
   preparing monitoring information to invoke the universal performance monitor, wherein the monitoring information includes identifying data relating to the activities of the one or more computer systems, and one or more invocation commands; and
   communicating the monitoring information from an access interface of the CLI shell console to a performance monitor interface of the universal performance monitor.

3. The computer-implemented method of claim 1, wherein the stopping is initiated by entering the stop command using an access interface of the CLI shell console.

4. The computer-implemented method of claim 1, further comprising analyzing, via a data access layer, the monitored data.

5. The computer-implemented method of claim 4, further comprising collecting, via the data access layer, results of the analyzing of the monitored data.

6. The computer-implemented method of claim 4, further comprising providing results of the analyzing via the CLI shell console.

7. A system comprising:
   a host computing device, which is remote from a Command-Line Interface (CLI) shell console, having a memory to store instructions for the CLI shell console and a processing device to execute the instructions, wherein the instructions cause the processing device to:
   invoke, using a start command via the CLI shell console, a universal performance monitor at the host computing device to perform monitoring of activities of a plurality of system components of one or more computing devices hosting a plurality of virtual machines, wherein the host computing device is associated with a plurality of monitoring tools according to information defined in user customized monitoring templates that consolidate the plurality of monitoring tools, wherein the CLI shell console provides an abstraction layer to access and process monitored data received from the universal performance monitor and further provides host performance information via a common interface to the host computer system independent of operating systems, monitoring use-cases, monitoring tools, or programming languages employed at the host computer system, and wherein the activities to be monitored pertain to one or more processors, memory, and virtual machines on the one or more computing devices;
   in response to a stop command requesting to stop the monitoring of the activities, by the CLI shell console, initiate stopping of the monitoring of the activities by the universal performance monitor; and
   cause display, by the CLI shell console, of the monitored data received by the abstraction layer, wherein the monitored data is generated from the monitoring of the activities by the universal performance monitor.

8. The system of claim 7, wherein the universal performance monitor serves as a universal monitoring tool to facilitate the monitoring by the plurality of monitoring tools of the activities of the plurality of system components, wherein invoking comprises:
preparing monitoring information to invoke the universal performance monitor, wherein the monitoring information includes identifying data relating to the activities of the one or more computing devices, and one or more invocation commands; and
communicating the monitoring information from an access interface of the CLI shell console to a performance monitor interface of the universal performance monitor.

9. The system of claim 7, wherein the stopping is initiated by entering the stop command using an access interface of the CLI shell console.

10. The system of claim 7, wherein the processing device is further to analyze, via a data access layer, the monitored data.

11. The system of claim 10, wherein the processing device is further to collect, via the data access layer, results of the analysis of the monitored data.

12. The system of claim 10, wherein the processing device is further to provide results of analyzing via the CLI shell console.

13. A non-transitory machine-readable medium including instructions that, when executed by a processing device, cause the processing device to perform a method, comprising:
invoking, using a start command via a Command-Line Interface (CLI) shell console, a universal performance monitor at a host computer system,
wherein the host computer system is remote from the CLI shell console and is associated with a plurality of monitoring tools according to information defined in user customized monitoring templates that consolidate the plurality of monitoring tools to perform monitoring of activities of a plurality of system components of one or more computer systems hosting a plurality of virtual machines, wherein the CLI shell console provides an abstraction layer to access and process monitored data received from the universal performance monitor and further provides host performance information via a common interface to the host computer system independent of operating systems, monitoring use-cases, monitoring tools, or programming languages employed at the host computer system, and
wherein the activities to be monitored pertain to one or more processors, memory and virtual machines on the one or more computer systems;
in response to a stop command requesting to stop the monitoring of the activities, initiating stopping, by the CLI shell console, of the monitoring of the activities by the universal performance monitor; and
causing display, by the CLI shell console, of the monitored data received by the abstraction layer, wherein the monitored data is generated from monitoring of the activities by the universal performance monitor.

14. The machine-readable medium of claim 13, wherein the universal performance monitor serves as a universal monitoring tool to facilitate the monitoring by the plurality of monitoring tools of the activities of the plurality of system components, wherein invoking comprises:
preparing monitoring information to invoke the universal performance monitor, wherein the monitoring information includes identifying data relating to the activities of the one or more computer systems, and one or more invocation commands; and
communicating the monitoring information from an access interface of the CLI shell console to a performance monitor interface of the universal performance monitor.

15. The machine-readable medium of claim 13, wherein the stopping is initiated by entering the stop command using an access interface of the CLI shell console.

16. The machine-readable medium of claim 13, wherein the method further comprises analyzing, via a data access layer, the monitored data.

17. The machine-readable medium of claim 16, wherein the method further comprises collecting, via the data access layer, results of the analyzing of the monitored data.

18. The machine-readable medium of claim 16, wherein the method further comprises providing results of the analyzing via the CLI shell console.

* * * * *